US012539478B2

(12) United States Patent
Viskari et al.

(10) Patent No.: US 12,539,478 B2
(45) Date of Patent: Feb. 3, 2026

(54) FILTER MEDIUM AND A USE THEREOF

(71) Applicant: Ahlstrom Oyj, Helsinki (FI)

(72) Inventors: Anne Viskari, Lempäälä (FI); Jan Kaukopaasi, Tampere (FI)

(73) Assignee: Ahlstrom Oyj, Espoo (FI)

( * ) Notice: Subject to any disclaimer, the term of this patent is extended or adjusted under 35 U.S.C. 154(b) by 741 days.

(21) Appl. No.: 17/378,874

(22) Filed: Jul. 19, 2021

(65) Prior Publication Data

US 2021/0339176 A1 Nov. 4, 2021

Related U.S. Application Data

(63) Continuation of application No. 16/604,185, filed as application No. PCT/FI2018/050266 on Apr. 13, 2018, now Pat. No. 11,065,570.

(30) Foreign Application Priority Data

Apr. 13, 2017 (FI) ..................................... 20175347

(51) Int. Cl.

| | |
|---|---|
| ***B32B 5/26*** | (2006.01) |
| ***B01D 35/00*** | (2006.01) |
| ***B01D 39/16*** | (2006.01) |
| ***B01D 39/20*** | (2006.01) |
| ***B32B 5/02*** | (2006.01) |
| ***B32B 7/12*** | (2006.01) |
| ***B32B 37/02*** | (2006.01) |
| ***B32B 37/06*** | (2006.01) |
| ***B32B 37/12*** | (2006.01) |
| ***B32B 37/18*** | (2006.01) |

(52) U.S. Cl.

CPC ......... *B01D 39/163* (2013.01); *B01D 35/005* (2013.01); *B01D 39/2024* (2013.01); *B32B 5/022* (2013.01); *B32B 5/26* (2013.01); *B32B 7/12* (2013.01); *B32B 37/02* (2013.01); *B32B 37/06* (2013.01); *B32B 37/1207* (2013.01); *B32B 37/182* (2013.01); *B01D 2239/0216* (2013.01); *B01D 2239/0618* (2013.01); *B01D 2239/064* (2013.01); *B01D 2239/0668* (2013.01); *B01D 2239/10* (2013.01); *B01D 2239/1216* (2013.01); *B01D 2239/1233* (2013.01); *B32B 2037/1215* (2013.01); *B32B 2250/20* (2013.01); *B32B 2262/0284* (2013.01); *B32B 2262/101* (2013.01); *B32B 2305/72* (2013.01); *B32B 2307/726* (2013.01); *B32B 2315/08* (2013.01); *B32B 2367/00* (2013.01)

(58) Field of Classification Search

CPC ...... B01D 39/00; B01D 39/08; B01D 39/083; B01D 39/14; B01D 39/16; B01D 39/1607; B01D 39/1615; B01D 39/1623; B01D 39/18; B01D 2239/00; B01D 2239/02; B01D 2239/0208; B01D 2239/06; B01D 2239/0604; B01D 2239/065; B01D 2239/0654; B01D 2239/086; B01D 2275/00; B01D 2275/10; B32B 23/00; B32B 23/02; B32B 23/04; B32B 23/044; B32B 23/10

See application file for complete search history.

(56) References Cited

U.S. PATENT DOCUMENTS

| | | | | |
|---|---|---|---|---|
| 5,948,529 A * | 9/1999 | Hastie | ....................... | D01F 8/06 428/373 |
| 2014/0130469 A1 * | 5/2014 | Nagy | .................. | B01D 39/163 55/486 |

* cited by examiner

*Primary Examiner* — Allison G Fitzsimmons

(74) *Attorney, Agent, or Firm* — Sisson & Banyas, Attorneys at Law, LLC; Jeffrey J. Banyas

(57) ABSTRACT

The present invention relates to a filter medium being at least formed of a pre-filter substrate laminated with a fine-filter substrate by means of a third binder, wherein the pre-filter substrate comprises synthetic fibers and a first binder, the pre-filter substrate working as a combined surface and depth filter, and the fine-filter substrate comprises at least a second binder and one of synthetic fibers and inorganic fibers.

17 Claims, No Drawings

FILTER MEDIUM AND A USE THEREOF

PRIORITIES AND CROSS REFERENCES

This Application claims priority from U.S. application Ser. No. 16/604,185 filed on 10 Oct. 2019, International Application No. PCT/FI2018/050266 filed on 13 Apr. 2018, and Finish application No. 20175347 filed on 13 Apr. 2017, the teachings of each of which are incorporated by reference herein in their entirety.

The present invention relates to a filter medium for use in both transportation and industrial filtration. Specifically, the invention relates to a filter medium that is efficient in the removal of solid particles from gases utilizing both surface and depth filtration and capable of being pulse-cleaned.

FIELD OF THE INVENTION

There is an increasing need for filtering impurities from the atmosphere, vapors and liquids, i.e. from all kinds of fluids. Especially, both transportation filtration and industrial air filtration, and specifically the fields of gas turbines, internal combustion engines and Air Pollution Control (APC) require filter media that are efficient in terms of particle removal. Moreover, indoor air quality is becoming important as respiratory illnesses, allergy and asthma symptoms occur with increasing frequency in industrialized civilization. While heating, ventilation and air conditioning (HVAC) filters can provide high particle removal capability, these filters also create significant air flow resistance. As a result, high efficiency HVAC filter systems require powerful fans to move air. Likewise, prior art filter media for air intake applications in gas turbines and transportation lead to an increased energy consumption. Furthermore, in addition to air filtration, there is a need to filter impurities from liquids, like for instance, engine oils, hydraulic oils etc.

BACKGROUND OF THE INVENTION

Traditionally, in industrial filtration, a so-called flow-through filter is used, the operation of which is based on leading the fluid to be filtered more or less at right angles through the filter medium till the medium gets clogged, or rather, the pressure loss across the filter medium grows to such an extent that the filter medium has to be replaced. Such prior art filter media use inorganic and synthetic fibers for the filtration of, e.g. air. A basic drawback of such filters is the fact that the filters' energy consumption increases over time because their resistance to air flow increases with the amount of particles which are removed from the air.

One way to control the energy consumption is to reduce the change interval of the filters so that the resistance to air flow does not grow too high. However, this kind of a practice increases the expenses related to both service and replacement of the filter. A way to reduce the replacement interval is to use, in place of planar filter elements, pleated filter elements by means of which the effective filter area is increased.

There are two basic types of flow-through filters, i.e. one applying surface filtration, and another applying depth filtration. Surface filtration refers to a process where the surface of the filter medium is so dense that the solids separated from the fluid remain on the surface of the filter. In depth filtration the filter medium has pores into which solid particles get trapped. Often the filter has pores of variable sizes such that the pore size gets the smaller the deeper in the filter the pore is located. Such a filter is oftentimes referred to as a gradient structure filter or a gradient pore structure filter. In practice, it means that solids of larger size are trapped in the pores closer to the entrance face of the filter and smaller solids travel a longer way deeper inside the filter medium until they are trapped. Micro-glass fibers are most often considered as the optimal material for the depth filters, especially in HVAC-types of filters. However, filters or filter elements made of micro-glass are, by nature, fragile, i.e. they need to be handled gently and they cannot be cleaned, whereby they have to be replaced periodically, and the replacement interval is relatively short. Naturally, there are also products applying both surface and depth filtration.

A way to increase the replacement interval, or lifetime, of filters in various industrial applications is the use of pulse-cleaning. In such applications the filter device is provided with means for periodically blowing compressed fluid through the filter in the direction opposite the normal filtering direction, whereby the fluid pulses flush most of the solids trapped in the pores of the filter away from the filter. The pulse-cleaning may be easily automated, whereby it saves manpower as well as other service and maintenance expenses. However, since pulse-cleaning uses compressed fluid it means considerable mechanical stress on the filter, whereby only a few types of pulse-cleanable filter elements may be found on the market. One of such types is a membrane filter discussed, for instance in WO-A1-2009152439, which has a membrane layer on a support surface, the membrane layer facing the incoming fluid. Another type is a filter having a nanofiber surface facing the incoming fluid. Both filters are pulse-cleanable but they function only as a surface filter, i.e. they do not have any pores to collect the solids but the solids remain on the surface of the filter. Therefore the pressure difference over the filter grows quickly and the need for pulse-cleaning is almost instantaneous. It is a feature characteristic to both the membrane and nanofiber filters that they lose their filtering capability very suddenly, in an unexpected manner, even when pulse cleaned, whereby the replace interval thereof is unpredictable. Furthermore, both nanofibers and membranes are expensive materials, whereby already the market price of such a filter is high, not to mention the various costs, including continuous condition monitoring, related to the needs of sudden replacement thereof.

Industrial filtration, like for instance gas turbine applications, require the use of HEPA-filters (HEPA=High Efficiency Particulate Air filter). Prior art knows two types of HEPA-filters. The first type is a flow-through filter based on the use of a high amount of micro-glass. The filter acts as a depth filter but is not a pulse-cleanable one due to its simple structure and high micro-glass content whereby its replacement interval is relatively short. The second HEPA-filter type is a membrane filter (WO-A1-2009152439) where the filtration takes place through a PTFE (polytetrafluoroethylene)-film as surface filtration. The membrane filter is, as already mentioned, a pulse-cleanable one, but as it is a surface filter, the openings in the surface of the filter get clogged suddenly, irrespective of the pulse-cleaning, whereby the replacement interval is hard to predict.

BRIEF DESCRIPTION OF THE INVENTION

The present invention aims at solving at least one of the above discussed problems.

An object of the present invention is to introduce a depth-type pulse-cleanable HEPA-filter, which maintains its filtering capability for a longer time period than HEPA-filters of prior art, i.e. which does not clog suddenly, in an unexpected manner.

Another object of the present invention is to introduce a pulse-cleanable HEPA-filter, the structure of which allows pulse-cleaning unlike prior art HEPA-filters, i.e. the filter medium is strong enough to endure cleaning pulses in a direction opposite to its normal operating direction.

Yet another object of the present invention is to introduce an improved pulse-cleanable filter medium that increases the efficient lifetime of an industrial filter medium.

Still another object of the present invention is to introduce an improved pulse-cleanable HEPA-filter medium, the replacement interval thereof being predictable.

The present invention therefore relates to a pulse-cleanable filter medium for filtering a fluid as defined in claim 1.

Other features characteristic to the present invention will become apparent from the dependent claims.

The present invention brings about a number of advantages of which at least the following may be mentioned

- filter medium of the present invention may be used in both pulse-cleanable and non-pulse-cleanable applications,
- filter medium of the present invention may be easily adjusted for a number of different HEPA-grades,
- highly repellent against humidity,
- HEPA-filter with optimal depth or surface filtration properties depending on media combination,
- pulse-cleanable filter that is made of low-cost materials,
- long lifetime,
- low maintenance and replacement costs, and
- no unexpected replacements, predictable lifetime.

Definitions

Bicomponent fibers or, more generally, multi-component fibers—the term refers to fibers formed from at least two polymers forming one fiber. As a particular example of a multi-component fiber, a "bicomponent fiber" includes two polymers arranged in substantially constantly positioned distinct zones across the cross-section of the bicomponent fiber and extend continuously along the length of the bicomponent fiber. The configuration of such a bicomponent fiber may be, for example, a sheath/core configuration wherein one polymer is surrounded by another or may be a side-by-side configuration or an "islands-in-the-sea" configuration. For two-component fibers, the polymers may be present in ratios of 75/25, 50/50, 25/75 or in any other desired ratio. Bicomponent fibers have usually a low melting point sheath and a higher melting point core, whereby their main function is bonding other fibers to form a mechanically strong substrate. Bicomponent fibers are normally nominated in the following manner PET/co-PET, PET/co-PE (PE=polyethylene), PET/co-PP (PP=polypropylene) or PET/co-PA, where the former mentioned polymer forms the sheath and the latter one the core. More generally, the bicomponent fibers may be made from a variety of thermoplastic materials including polyolefins (such as polyethylenes, polypropylenes), polyesters (such as polyethylene terephthalate, polybutylene terephthalate, PCT), nylons including nylon 6, nylon 6,6, nylon 6,12, etc. Any thermoplastic that can have an appropriate melting point can be used in the low melting component of the bicomponent fiber. The polymers of the bicomponent (core/shell or sheath and side-by-side) fibers are made up of different thermoplastic materials, such as for example, polyolefin/polyester (sheath/core) bicomponent fibers whereby the polyolefin, e.g. polyethylene sheath, melts at a temperature lower than the core, e.g. polyester. Typical thermoplastic polymers include polyolefins, e.g. polyethylene, polypropylene, polybutylene, and copolymers thereof, polytetrafluoroethylene, polyesters, e.g. polyethylene terephthalate, polyvinyl acetate, polyvinyl chloride acetate, polyvinyl butyral, acrylic resins, e.g. polyacrylate, and polymethylacrylate, polymethyl-methacrylate, polyamides, namely nylon, polyvinyl chloride, polyvinylidene chloride, polystyrene, polyvinyl alcohol, polyurethanes, cellulosic resins, namely cellulosic nitrate, cellulosic acetate, cellulosic acetate butyrate, ethyl cellulose, etc., copolymers of any of the above materials, e.g. ethylene-vinyl acetate copolymers, ethylene-acrylic acid copolymers, styrene-butadiene block copolymers, Kraton rubbers and the like.

Binder—general term for means used for bonding various fibers to one another. Includes liquid and solid binder resins. The solids comprising powders, granules, fully meltable fibers, and partially meltable fibers (bicomponent and multicomponent fibers).

Binder fiber—general term for fibers comprising fully meltable fibers and bi- and multicomponent fibers.

Binder resins—general term for substances bonding various fibers into a mechanically stable substrate. May be divided into thermoplastic and thermosetting resins. The thermoplastic binder resin materials may be used in the form of a dry powder, granule or liquid. Typically they are aqueous dispersions of vinyl thermoplastic resins. Resin used as binder may be in the form of water soluble or dispersible polymer added directly to the fiber suspension or in the form of thermoplastic binder fibers of the resin material intermingled with the fiber suspension to be activated as a binder by heat applied after the substrate is formed. Resins include vinyl acetate materials, vinyl chloride resins, polyvinyl alcohol resins, polyvinyl acetate resins, polyvinyl acetyl resins, acrylic resins, methacrylic resins, polyamide resins, polyethylene vinyl acetate copolymer resins, thermosetting such as urea phenol, urea formaldehyde, melamine, epoxy, polyurethane, curable unsaturated polyester resins, polyaromatic resins, resorcinol resins and similar elastomer resins. The preferred materials for the water soluble or dispersible binder polymer are water soluble or water dispersible thermosetting resins such as acrylic resins, methacrylic resins, polyamide resins, epoxy resins, phenolic resins, polyureas, polyurethanes, melamine formaldehyde resins, polyesters and alkyd resins, generally, and specifically, water soluble acrylic resins, methacrylic resins, polyamide resins, that are in common use in the industry. Such binder resins typically coat the fiber and adhere fiber to fiber in the final non-woven matrix. Sufficient resin is added to the furnish to fully coat the fiber without causing any film to cover the pores formed in the sheet, media, or filter material. The resin may be added to the furnish during the non-woven web formation or may be applied to the web after the formation thereof.

Cross Machine Direction (CD or XMD)—the direction perpendicular to the direction in which the fibrous web travels as it is forming.

DENS—Filtering Efficiency—Standard BS EN 1822 describes the factory testing of the filtration properties of absolute filters i.e. Efficient Particulate Air (EPA)-, High Efficiency Particulate Air (HEPA)- and Ultra Low Penetration Air (ULPA)-filters. The filters are divided in a number of groups based on the filtration efficiency thereof. The filtration efficiency is determined by using Di-Ethyl-Hexyl-Sebacat (DENS) droplets as the particles to be filtered. The filtration efficiency indicates the percentage of particles trapped by the filter compared to the full amount of particles in the flow to be filtered. The filter groups and their required minimum filtration efficiencies are as follows:

E10—≥85%,

E11—≥95%,

E12—≥99.6%,

H13—≥99.95%,

H14—≥99.995%,

U15—≥99.9995%,

U16—≥99.99995%, and

U17—≥99.999995%.

Depth filtration—refers to a process where the filter medium has pores of variable sizes such that the pore size gets the smaller the deeper in the filter the pore is located, oftentimes such a filter structure is referred to as gradient structure filter or gradient pore structure filter.

Finess—fiber or tow thickness, normally given in deniers.

Inorganic fibers—fibers made of inorganic materials, like for instance glass, carbon, silica.

Machine Direction (CD or XMD)—the direction in which the fibrous web travels as it is forming.

Meltable fibers—fibers melting fully when heated, used for bonding fibers to one another and made of, for instance, PE (polyethylene), PP, polyvinyl chloride (PVC) and polyvinyl alcohol (PVA).

Pulse-cleanable—the term refers to cleanability of a filter medium by means of a fluid jet in a direction opposite the flow direction of the fluid to be cleaned. A test procedure used for determining the cleanability of the filter medium is discussed in VDI 3926-2004, Testing of cleanable filter media, Standard test for the evaluation of cleanable filter media. ISO 11057:2011 also discusses a standard reference test method for the comparative characterization and evaluation of pulse-jet cleanable filter media.

Surface filtration—refers to a process where the surface of the filter medium is so dense that the solids separated from the fluid remain on the surface of the filter.

Synthetic fibers—fibers made, for instance, of polyethylene terephthalate (PET), polybutylene terephthalate (PBT), polypropylene (PP), polyamide (PA), acrylic, lyocell, rayon, aramid, nylon, polyolefin, polyester, or viscose.

DETAILED DESCRIPTION OF THE INVENTION

Generally speaking the filter medium of the present invention is made of at least two separately manufactured filter substrates, i.e. a pre-filter substrate and a fine-filter substrate, laminated together to form a pulse-cleanable filter medium, or a fine-filter substrate laid on a separately manufactured pre-filter substrate to form a pulse-cleanable filter medium.

Pre-Filter Substrate

The pre-filter substrate comprises at least synthetic fibers like polyethylene terephthalate (PET), polybutylene terephthalate (PBT), polypropylene (PP), polyamide (PA), acrylic, lyocell, rayon, aramid, nylon, polyolefin, polyester, or viscose fibers having an average diameter ranging from 0.1 to 100 micrometers, preferably ranging from 0.1 to 50 micrometers, more preferably ranging from 0.1 to 30 micrometers and an appropriate first binder. A part of the synthetic fibers may be replaced with inorganic fibers, like micro-glass, carbon or silica fibers having an average diameter ranging from 0.01 to 5 micrometer. A preferred choice for the first binder is multicomponent fibers, preferably, but not necessarily, bicomponent fibers like for instance PET/co-PET, PET/co-PE, PET/co-PP, or PET/co-PA fibers (see more detailed information in 'Definitions' above), having a finess ranging from 1 to 15 den, preferably about 2.2 den, 4 den or 6 den, i.e. the diameter being of the order of 8-25 μm, and after curing, resulting from the melting of the sheath, naturally less. Another option, in addition to or in place of the bi- or multi-component fibers, for the first binder is binder resin, such as at least one of acrylic resins, alkyd resins, butadiene resins, epoxy resins, melamine formaldehyde resins, melamine resins, methacrylic resins, phenolic resins, polyamide resins, polyaromatic resins, polyester resins, polyethylene vinyl acetate copolymer resins, polyurea resins, polyurethane resins, polyvinyl acetate resins, polyvinyl acetyl resins, polyvinyl alcohol resins, polyvinylchloride (PVC) resins, resorcinol resins, styrene resins, urea phenol resins, urea formaldehyde resins, vinyl acetate resins and vinyl chloride resins or any combination thereof that may be used in bonding the fibers to one another. In place of or in addition to the bi- or multicomponent fibers and/or the above listed binder resins it is also possible to use, as at least a part of the first binder, fully meltable fibers like for instance at least one of PE (polyethylene), PP, polyvinyl chloride (PVC) and polyvinyl alcohol (PVA) fibers.

The first binder, preferably, but not necessarily, the bicomponent fibers provided in the pre-filter substrate, ensures most of the mechanical strength and integrity of the filter, and makes it possible that pulse-cleaning, i.e. a powerful jet of compressed fluid blown in a direction against the ordinary working direction of the filter, may be applied for cleaning the filter. Additionally, the pre-filter substrate contains, in at least a majority of the embodiments of the present invention, micro-glass fibers, which give both fine-filter capability and mechanical strength to the substrate.

It is a feature common to all embodiments of the present invention that depending on the type of the pre-filter, its contribution to the final DEHS-efficiency may vary. In other words, the pre-filter substrate provides the HEPA-filter with most of its mechanical strength, i.e. ensures the pulse-cleanable structure of the filter, and with a part of the DEHS-efficiency of the entire filter, whereas the differences in the DEHS-efficiency of the filter are mostly provided by the fine-filter substrate.

Thus, the pre-filter substrate of the present invention has a basis weight of 20 $g/m^2$-80 $g/m^2$, preferably about 30 $g/m^2$-70 $g/m^2$, more preferably about 35-50 $g/m^2$. The basis weight is measured in accordance with ISO 536:2012, Paper and board,—Determination of grammage. The pre-filter substrate, generally, in accordance with a first preferred embodiment of the present invention, comprises 20-95 wt-%, preferably 25-80 wt-%, more preferably about 25-50 wt-% synthetic fibers; 0-50 wt-%, preferably 20-40 wt-%, more preferably about 30-35 wt-% bicomponent fibers; 0-30 wt-%, preferably 10-25 wt-%, more preferably about 15-20 wt-% micro-glass fibers; and, optionally, 0-20 wt-%, preferably about 0-15 wt-%, more preferably about 2-10 wt-% binder resin or fully meltable fibers. The wt-% throughout the specification refers to the dry amount of the components forming the intermediate substrate or the end product. i.e. the pulse-cleanable filter medium.

In accordance with a second preferred embodiment of the present invention the pre-filter substrate comprises 20-95 wt-% synthetic fibers and 5-80 wt-% first binder.

In accordance with a third preferred embodiment of the present invention the pre-filter substrate comprises 25-80 wt-%, preferably about 35-50 wt-% synthetic fibers; 20-75 wt-%, preferably about 40-55 wt-% bi- or multicomponent fibers; and 0-15 wt-%, preferably 2-10 wt-% binder resin or fully meltable fibers.

In accordance with a fourth preferred embodiment of the present invention the pre-filter substrate comprises 55-85 wt-%, preferably 60-80 wt-% synthetic fibers; 10-30 wt-%, preferably about 15-25 wt-% micro-glass fibers; and 2-15 wt-%, preferably about 2-10 wt-% binder resin or fully meltable fibers.

In accordance with a fifth preferred embodiment of the present invention the pre-filter substrate comprises 25-60 wt-%, preferably 30-60 wt-%, more preferably about 40-50 wt-% synthetic fibers; 20-45 wt-%, preferably 30-40 wt-% bicomponent fibers; 10-30 wt-%, preferably about 15-20 wt-% micro-glass fibers; and 0-20 wt-%, preferably about 0-15 wt-%, more preferably about 2-10 wt-% binder resin or fully meltable fibers.

In accordance with a sixth preferred embodiment of the present invention the pre-filter substrate contains two types of synthetic fibers, preferably PET-fibers, i.e. 3-35 weight-%, preferably 33 weight-% PET-fibers with a diameter of 6 μm and 5-15 wt-%, preferably 10 wt-% PET-fibers with a diameter of 10 μm; 30-40 wt-% bicomponent fibers; two types of micro-glass fibers, i.e. 10-15 wt-%, preferably 13 wt-% micro-glass fibers with a diameter of 0.1-1 μm and 1-9 wt-%, preferably 5 wt-% micro-glass fibers with a diameter of 0.1-0.6 μm diameter 5%, and 5 wt-% acrylic binder.

In accordance with a seventh preferred embodiment of the present invention any one of the pre-filter substrates discussed above may be formed by using a wet-laid technology, i.e. the various different components forming the pre-filter substrate are mixed into a liquid, preferably water, to form a fiber suspension or furnish. The first binder, if in appropriate form, i.e. liquid or solid, may be added to the furnish or applied through the production process with an application of low impact to the fiber structure. The furnish is, after being mixed to a homogenous mixture, laid from a headbox on a liquid pervious wire for forming a fibrous nonwoven web. The wet-laying of the filter substrate has the advantage that, as a result of different speed to settle to form a web, the concentration of the finer and heavier micro-glass fibers, if present in the furnish, is at its highest close to the wire whereas the other, lighter fibers have their higher concentrations farther away from the wire. In practice, this means that there is a porosity gradient in the filter substrate, i.e. the pores in the filter substrate reduce in size while approaching the wire-side of the substrate. Therefore, the filter substrate is capable of performing so called depth filtration. The same phenomenon may still take place even if there were no micro-glass fibers as, in the furnish, there may be fibers having different properties, such as specific gravity, fiber length, etc. in view of settling in the web.

In accordance with a further variation of the seventh preferred embodiment of the present invention the headbox used in the production of the pre-filter substrate is divided in vertical direction into two separate chambers each having a slice opening of its own. Both chambers of the headbox are provided with a fiber suspension or a furnish of its own, whereby the actual pre-filter substrate is formed into a fibrous nonwoven web having two different layers entangled to one another. The basic principles of laying more than one layer of furnish in making a web on a wire is discussed in, for instance, U.S. Pat. No. 3,598,696. When producing a two-layer substrate by means of a wet-laid method, the furnish for the first layer formed on the wire, i.e. the lower layer, may, for instance, comprise 10-45 wt-%, preferably 10-20 wt-% synthetic fibers; 0-30 wt-%, preferably 10-20 wt-% bi- or multicomponent fibers; and 0-10 wt-%, preferably 0-5 wt-% first binder resin and/or fully meltable fibers. The second furnish for the second layer wet-laid on the first layer may, for instance, comprise 15-30 wt-%, preferably 15-25 wt-% synthetic fibers; 0-20 wt-%, preferably 10-20 wt-% bi- or multicomponent fibers; 10-30 wt-%, preferably 15-20 wt-% micro-glass; and 0-10 wt-%, preferably 0-5 wt-% first binder resin and/or fully meltable fibers. The above percentage values refer to the dry weight of the entire substrate. The synthetic fibers may be of the same quality, for instance 6 or 10 micrometer PET-fibers, or a mixture of fibers having different diameters. The micro-glass fibers have an average diameter of 0.01-5 micrometer, a majority, i.e. more than 60% of the fibers having an average diameter between 0.1 and 2 micrometer. However, as the micro-glass fibers are commercially available in various grades (0.4, 0.6, 0.8 etc. or 0.1 to 0.6 micrometers, 0.1 to 0.8 micrometers, 0.1 to 1 micrometers, 0.5 to 5 micrometers, etc., referring to the average diameter of the fibers in the grade) the micro-glass used in the furnish may be of only one grade or of a mixture of at least two different grades.

When producing the substrate of the above discussed furnishes in the above discussed manner the two-layer production ensures that a relatively dense layer of synthetic fibers, and possibly binder fibers, is first arranged on the wire whereafter the micro-glass fibers, if used, as clearly the heaviest fibers of the various fibers of the furnish for the upper layer settle on the synthetic fiber or synthetic-binder fiber layer already present on the wire, and the synthetic and possibly binder fibers of the second furnish settle on the micro-glass fibers. Thus, when the web, for forming the substrate, is heated and combined to a filter both surfaces of the substrate have a strong synthetic-bicomponent fiber matting, which gives excellent internal strength for the substrate.

In accordance with a still further variation of the seventh preferred embodiment of the present invention the headbox used in the production of the pre-filter substrate is divided in vertical direction into three separate chambers each having a slice opening of its own, like for instance discussed in U.S. Pat. No. 3,598,696. Each chamber of the headbox is provided with a fiber suspension or a furnish of its own, whereby the actual pre-filter substrate is formed into a fibrous nonwoven web having three layers entangled to one another. All three furnishes may be different, or two furnishes may be the same and one different, whereby, in the latter case, advantageously, the outer layers are formed of the same furnish and the center layer of a different furnish. Naturally, also all three furnishes may be the same. In accordance with a specific example the two outermost layers of the pre-filter substrate are formed of a furnish comprising at least of a first binder (preferably bicomponent fibers), and synthetic fibers, and the center layer at least of a first binder (preferably bicomponent fibers), micro-glass fibers and synthetic fibers.

In accordance with an even further variation of the seventh preferred embodiment of the present invention, when producing a three-layer substrate by means of a preferred version of the wet-laid method discussed above, the first and third furnishes for the first layer formed on the wire, i.e. the lowest layer, and the third, i.e. the uppermost layer, each comprise 5-30 wt-%, preferably 5-20 wt-% synthetic fibers; 0-20 wt-%, preferably 5-15 wt-% bi- or multicomponent fibers; and 0-10 wt-%, preferably 0-5 wt-% first binder resin and/or fully meltable fibers. The second furnish for the second layer wetlaid on the first layer comprises 15-25 wt-%, preferably 15-20 wt-% synthetic fibers; 0-20 wt-%, preferably 10-20 wt-% bi- or multicomponent fibers; 10-30 wt-%, preferably 15-20 wt-% micro-glass fibers; and 0-10 wt-%, preferably 0-5 wt-% first binder resin and/or fully meltable fibers. The above percentage values refer to the dry weight of the entire substrate. The synthetic fibers may be of the same quality, for instance 6 or 10 micrometer fibers, or a mixture of fibers having different diameters. The micro-glass fibers have an average diameter of 0.01 to 5 micrometer, a majority, i.e. more than 60% of the fibers having an average diameter between 0.1 and 2 micrometer. However, as the micro-glass fibers are commercially available in various grades (0.4, 0.6, 0.8 etc. or 0.1-0.6 micrometers, 0.1-0.8 micrometers, 0.1-1 micrometers, 0.5-5 micrometers, etc., referring to the average diameter of the fibers in the grade) the micro-glass used in the furnish may be of only one grade or of a mixture of at least two different grades.

When producing the substrate of the above discussed furnishes in the above discussed manner the three-layer production ensures that a relatively dense layer of synthetic and binder fibers is first arranged on the wire whereafter the micro-glass, as clearly the heaviest fibers of the various fibers of the second furnish for the second layer settle on the synthetic-binder fiber layer already present on the wire, and the synthetic and binder fibers of the second and third furnishes settle on the micro-glass fibers. Thus, when the substrate is heated and compressed both surfaces of the substrate have strong synthetic-binder fiber matting, which gives excellent internal strength for the substrate.

In each variation, after being deposited on the wire, water is drained or drawn out of the fibrous nonwoven web to dry the web to a desired dryness. A clear advantage in using the wet-laying is that in each layer a gradient structure is formed, i.e. a structure that allows depth filtration, as there are always fibers with varying properties in view of settling in the substrate, whereby certain fibers sink more quickly, and certain fibers more slowly remaining, thus, on top of the substrate.

In accordance with an eighth preferred embodiment of the present invention the fibrous nonwoven web may also be air-laid or dry-laid on a surface by using the well-known dry laying methods, like for instance by carding, airlaying, spunlaid, meltblown or by a combination thereof.

In case the first binder was not added to the mixture of fibers before the web-forming, and the use thereof is considered necessary, the first binder may be applied on the fibrous nonwoven web by spraying, gravure coating, impregnation, scattering etc. whereafter the web is heated to melt the binder fibers and/or the binder resin to bond the various fibers to one another.

Finally, the pre-filter substrate may be provided, if desired, with means for making it repellent against water, humidity, hydro carbons and/or alcohols. Such chemical means may be formed of or comprise silicones or fluorochemicals. The chemicals may be arranged on one or more of the fibers forming the substrate before the forming of the furnish, or the furnish may be provided with respective liquid chemicals, or the web may be provided with the chemicals by means of, for instance, impregnation or coating.

In view of the above discussed various embodiments of the pre-filter substrate it should be understood that any embodiment of the pre-filter substrates discussed above may be used with any embodiment of the various fine-filter substrates discussed both in the following and in the later product examples.

Fine-Filter Substrate

The fine-filter substrate comprises a second binder and at least either synthetic fibers and/or inorganic fibers. The second binder comprises at least one of bicomponent fibers, multicomponent fibers, fully meltable fibers and a binder resin. The synthetic fibers are preferably chosen from polyethylene terephthalate (PET), polypropylene (PP), PBT, polyamide (PA), acrylic, rayon, aramid, nylon, polyolefin, polyester, lyocell, or viscose fibers having an average diameter ranging from 0.1 to 100 micrometers or inorganic fibers. The inorganic fibers are of micro-glass, carbon or silica, preferably micro-glass fibers having an average diameter ranging from 0.01 to 5 micrometer. The binder resin comprises at least one of acrylic resins, alkyd resins, butadiene resins, epoxy resins, melamine formaldehyde resins, melamine resins, methacrylic resins, phenolic resins, polyamide resins, polyaromatic resins, polyester resins, polyethylene vinyl acetate co-polymer resins, polyurea resins, polyurethane resins, polyvinyl acetate resins, polyvinyl acetyl resins, polyvinyl alcohol resins, polyvinylchloride (PVC) resins, resorcinol resins, styrene resins, urea phenol resins, urea formaldehyde resins, vinyl acetate resins and vinyl chloride resins or any combination thereof. The fine-filter substrate may, in addition to the above discussed fiber/s, comprise chop-strand glass fibers having an average diameter ranging from 1 to 30 micrometers.

Generally, in accordance with a ninth preferred embodiment of the present invention, the fine-filter substrate of the present invention comprises 20-60 wt-%, preferably 20-50 wt-% synthetic fibers; 10-80 wt-%, preferably 15-70 wt-% micro-glass fibers and 2-15 wt-%, preferably 3-10 wt-% second binder.

In accordance with a tenth preferred embodiment of the present invention the fine-filter substrate comprises 35-55 wt-%, preferably 40-50 wt-% synthetic fibers; 10-25 wt-%, preferably 15-20 wt-% micro-glass fibers; 20-45 wt-%, preferably 30-40 wt-% bicomponent or multicomponent fibers, and 2-15 wt-%, preferably 3-10 wt-% second binder.

In accordance with an eleventh preferred embodiment of the present invention the fine-filter substrate comprises 15-40 wt-%, preferably 20-35 wt-% synthetic fibers, 50-80 wt-%, preferably 60-70 wt-% micro-glass fibers and 2-15 wt-%, preferably 3-10 wt-% second binder.

The fine-filter substrate may be produced by any well-known means of web forming. Thus, both air-laid and wet-laid production processes may be used. However, wet laying is the preferred manufacturing choice due to its variability. Thus, all the basic wet-laying methods discussed earlier in connection with the production of the pre-filter substrate are applicable here, too. In other words, the fine-filter substrate may be manufactured as a single-layer, a two-layer or a multi-layer substrate resulting in a gradient pore structure filter, i.e. a depth-type filter medium.

Example 1—E10 Filter Medium

The filter medium in accordance with a twelfth preferred embodiment of the present invention is designed to fulfil the requirements set by BS EN 1822 for an E10 filter medium, i.e. a filter having the DENS efficiency of at least 85%. The filter medium has a total basis weight of 50 g/m$^2$-150 g/m$^2$, preferably about 70-110 g/m$^2$. The filter medium contains a pre-filter substrate such as discussed already above.

The E10 filter medium contains, as discussed also above, another substrate, i.e. a fine-filter substrate, which is, in this embodiment, as to its manufacture, similar to the above discussed pre-filter substrate. The fine-filter substrate may, however, have a somewhat different composition from the above discussed versions of the pre-filter substrate. It is a preferred, but not a necessary, feature for the desired operation of the fine-filter substrate that the furnish therefor contains 10-80 wt-%, preferably 10-25 wt-%, more preferably 15-20 wt-% micro-glass fibers and at least 5 wt-% second binder in an appropriate form. The second binder may be either the same binder optionally used in the pre-filter substrate, i.e. at least one of acrylic resins, alkyd resins, butadiene resins, epoxy resins, melamine formaldehyde resins, melamine resins, methacrylic resins, phenolic resins, polyamide resins, polyaromatic resins, polyester resins, polyethylene vinyl acetate copolymer resins, polyurea resins, polyurethane resins, polyvinyl acetate resins, polyvinyl acetyl resins, polyvinyl alcohol resins, polyvinylchloride (PVC) resins, resorcinol resins, styrene resins, urea phenol resins, urea formaldehyde resins, vinyl acetate resins and vinyl chloride resins or any combination thereof, or bicomponent fibers, like for instance PET/co-PET, PET/co-PE, PET/co-PP, or PET/co-PA fibers (see more detailed information in Definitions) or multicomponent fibers or fully meltable fibers, such as at least one of PE (polyethylene), PP, polyvinyl chloride (PVC) and polyvinyl alcohol (PVA) fibers. The second binder preferably comprises 2-15 wt-%, preferably 3-10 wt-% binder or fully meltable fibers, and 20-45 wt-%, preferably 30-40 wt-% bicomponent or multicomponent fibers. Furthermore, the furnish comprises 20-60 wt-%, preferably 35-55 wt-%, more preferably 40-50 wt-% synthetic fibers, too. It should be also understood that bi- or multicomponent fibers may be used to replace at least a part of the binder and the synthetic fibers or vice versa, i.e. by increasing the amount of bi- or multicomponent fibers the amount of binder and synthetic fibers may be reduced and by reducing the amount of bi- or multicomponent fibers the amount of binder and synthetic fibers may be increased.

As to the fine-filter substrate, it may be formed of a two-layer or a three-layer web as discussed already earlier in connection with the pre-filter substrate.

Finally, the fine-filter substrate may be provided, if desired, with means for making it repellent against water, humidity, hydro carbons and/or alcohols. Such chemical means may be formed of or comprise silicones or fluorochemicals. The chemicals may be arranged on one or more of the fibers forming the fine-filter substrate before the forming of the furnish, or the furnish may be provided with respective liquid chemicals, or the web may be provided with the chemicals by means of, for instance, impregnation or coating.

For producing the E10 filter medium the two substrates are laminated to one another by means of, for instance, applying 3-10 g/m$^2$, preferably about 5 g/m$^2$, for instance by gravure coating, curtain coating or spraying, appropriate third binder, i.e. a hot melt binder or adhesive, like for instance ethylene-vinyl acetate (EVA) copolymers, polyolefins (PO), atactic polypropylene (PP or APP), polybutene-1, oxidized polyethylene, polyamides and polyesters, styrene block copolymers (SBC), preferably a polyurethane hot melt glue on one of the substrates, and thereafter combining the substrates to form the pulse-cleanable filter medium. Another way to laminate the two substrates together is to heat at least one of the substrates to make the thermoplastic already therein tacky, and thereafter combine the substrates to form the pulse-cleanable filter medium. The thermoplastic above comprises both meltable fibers and bi- or multicomponent fibers.

In accordance with a variation of the twelfth preferred embodiment of the present invention the wire-sides of the webs, i.e. the sides of the webs located against the wire during the manufacturing of the webs, are positioned against one another in the final E10 filter medium. In accordance with another variation of the present invention the wire-side of one web is positioned against the side away from the wire of the other web in the final E10 filter medium. In accordance with a further variation of the twelfth preferred embodiment of the present invention the wire-sides of the webs are positioned as the outer faces of the filter medium, i.e. the sides facing away from the wire in their manufacturing stage are being positioned against one another in the final E10 filter medium. When using the filter medium, it may be used as the wire side positioned as the dirty side, i.e. against the dirty fluid flow to the filter medium or the wire side as the clean side, i.e. facing away from the dirty fluid flow.

As an exemplary E10 product may be mentioned a filter medium comprising a pre-filter substrate and a fine-filter substrate. The pre-filter substrate is manufactured in accordance with the variation of the above discussed seventh preferred embodiment of the present invention by using a three-layer headbox provided with two different furnishes such that the surface layers are of similar furnish and the center layer of the different furnish. The pre-filter substrate comprises 33 wt-% PET-fibers having a diameter of 6 micrometer, 10 wt-% PET-fibers having a diameter of 10 micrometer, 13 wt-% micro-glass fibers having an average diameter between 0.1 and 0.6 micrometer, 5 wt-% micro-glass fibers having an average diameter between 0.1 and 1.0 micrometer, 34 wt-% bi-component fibers having an average diameter between 8 and 25 micrometer, and 5 wt-% binder or meltable fibers.

The fine filter substrate is equal with the pre-filter substrate. Thus both the pre-filter substrate and the fine-filter substrate have a tensile strength determined in accordance with standard Scan-P 38:80, i.e. ISO 1924-2: 1994, in Machine Direction (MD) of the order of 600-700 N/m, and in Cross Machine Direction (CD) of the order of 400-500 N/m. In a similar manner both the pre-filter substrate and the fine-filter substrate have the same Mullen burst strength determined in accordance with standard Scan-P 24, Paper and board or ISO 2758. The substrates have both the dry and the wet Mullen burst strength of the order of 100-150 kPa. The mean flow pore size determined by using Porometer 3G (Quantachrome Instruments, Boynton Beach, Florida U.S.A.) varies between 8 and 10 micrometer. The fine-filter substrate has, naturally, the same mean flow pore values.

The tensile strength for the laminated E10 product is in MD-direction of the order of 1500-1600 N/m, and in CD-direction of the order of 800-900 N/m, the Mullen burst strength (both wet and dry) within 200-400 kPa, preferably within 250-400 kPa, and the mean flow pore size between 5 and 6 micrometer.

By means of the above described laminated structure of the filter medium the strength properties of the medium are excellent so that the filter medium tolerates pulse-cleaning, i.e. a powerful fluid jet in the direction opposite the ordinary working direction of the filter medium.

Example 2—E12 Filter Medium

The filter medium in accordance with a thirteenth preferred embodiment of the present invention is designed to fulfil the requirements set by BS EN 1822 for an E12 filter medium, i.e. the DENS efficiency is at least 99.5%. The E12 filter medium of the present invention has a total basis weight of 50 to 200 g/m$^2$, preferably from 80 to 150 g/m$^2$, more preferably 100-130 g/m$^2$. The E12 filter medium of the present invention contains a pre-filter substrate with a basis weight of 20 g/m$^2$-80 g/m$^2$, preferably 30 g/m$^2$-70 g/m$^2$, more preferably 35-50 g/m$^2$, corresponding to the pre-filter substrate discussed already above, and a fine-filter substrate having a basis weight of 30 g/m$^2$-180 g/m$^2$, preferably from 50-120 g/m$^2$, more preferably about 60-90 g/m$^2$.

The fine-filter substrate is formed of synthetic fibers like for instance PET, PBT, PP, PA, acrylic, lyocell, rayon, aramid, nylon, polyolefin, polyester, or viscose fibers; micro-glass fibers; and a second binder. The second binder comprises at least one of bi-component fibers, multicomponent fibers, fully meltable fibers and binder resins. The binder resins comprise at least one of acrylic resins, alkyd resins, butadiene resins, epoxy resins, melamine formaldehyde resins, melamine resins, methacrylic resins, phenolic resins, polyamide resins, polyaromatic resins, polyester resins, polyethylene vinyl acetate copolymer resins, polyurea resins, polyurethane resins, polyvinyl acetate resins, polyvinyl acetyl resins, polyvinyl alcohol resins, polyvinylchloride (PVC) resins, resorcinol resins, styrene resins, urea phenol resins, urea formaldehyde resins, vinyl acetate resins and vinyl chloride resins or any combination thereof. The fine-filter substrate contains 10-80 wt-%, preferably 50 to 80 wt-%, more preferably 60-70 wt-% micro-glass fibers; 20-60 wt-%, preferably 15-40 wt-%, more preferably 20-35 wt-% synthetic fibers; and 2-15 wt-%, preferably about 3-10 wt-% second binder (including powder, granule or liquid binders). As to the second binder it should be understood that also bi- or multicomponent fibers may be used. However, in such a case the amount of both the synthetic fibers and the binder should be reduced. For example by replacing one half of the synthetic fibers with bi- or multicomponent fibers also the amount of the binder could be about halved. The micro-glass fibers have an average diameter of 0.01 to 5 micrometer, a majority, i.e. more than 60% of the fibers having an average diameter between 0.1 and 2 micrometer. However, as the micro-glass fibers are commercially available in various grades (0.4, 0.6, 0.8 etc. or 0.1-0.6 micrometers, 0.1-0.8 micrometers, 0.1-1 micrometers, 0.5-5 micrometers, etc., referring to the average diameter of the fibers in the grade) the micro-glass used in the furnish may be of only one grade or of a mixture of at least two grades.

In accordance with a preferred variation of the thirteenth embodiment of the present invention, micro-glass fibers from at least two different grades, or diameter ranges, is used, for instance about 10-20 wt-% of the micro-glass originating from a grade having an average diameter of 1 to 3 micrometers, and the rest (90-80 wt-%) originating from a grade having an average diameter of 0.1 to 1.0 micrometer. Preferably, the synthetic fibers are PET-fibers having an average diameter of 10 to 15 micrometers.

The web for the fine-filter substrate may be produced with any known papermaking-type machines such as commercially available fourdrinier, wire cylinder, Stevens former, rotoformer, inver former, venti former, and inclined delta former. After the fibrous web for the fine-filter substrate is dried to an appropriate dryness second binder, unless added to the furnish for making the fine-filter substrate, is applied on the web by spraying, gravure coating, impregnation, scattering etc. whereafter the web is heated to bind the various fibers to one another.

Finally, the fine-filter substrate may be provided, if desired, with means for making it repellent against water, humidity, hydro carbons and/or alcohols. Such chemical means may be formed of or comprise silicones or fluorochemicals. The chemicals may be arranged on one or more of the fibers forming the fine-filter substrate before the forming of the furnish, or the furnish may be provided with respective liquid chemicals, or the web may be provided with the chemicals by means of, for instance, impregnation or coating.

For producing the E12 filter medium the two substrates, i.e. the pre-filter substrate and the fine-filter substrate are laminated to one another by means of applying, for instance by gravure coating, curtain coating or spraying 3-10 g/m$^2$, preferably about 5 g/m$^2$, appropriate third binder, i.e. hot melt binder or adhesive, like for instance ethylene-vinyl acetate (EVA) copolymers, polyolefins (PO), atactic polypropylene (PP or APP), polybutene-1, oxidized polyethylene, polyamides and polyesters, styrene block copolymers (SBC), preferably a polyurethane hot melt glue on one of the substrates, and there-after combining the substrates to form the pulse-cleanable filter medium. Another way to laminate the two substrates together is to heat at least one of the substrates to make the thermoplastic already therein tacky, and thereafter to combine the substrates to form the pulse-cleanable filter medium. The thermoplastic here refers to either meltable or bi- or multicomponent fibers.

In accordance with another variation of the thirteenth preferred embodiment of the present invention the wire-sides of the substrates, i.e. the sides of the webs located against the wire during the manufacturing of the substrates, are positioned against one another in the final E12 filter medium. In accordance with yet another variation of the thirteenth preferred embodiment of the present invention the wire-side of one web is positioned against the side away from the wire of the other web in the final E12 filter medium. In accordance with a further variation of the thirteenth preferred embodiment of the present invention the wire-sides of the webs are positioned as the outer faces of the filter medium, i.e. the sides facing away from the wire in their manufacturing stage are being positioned against one another in the final E12 filter medium. When using the filter medium, it may be used as the wire side positioned as the dirty side, i.e. against the dirty fluid flow to the filter medium or the wire side as the clean side, i.e. facing away from the dirty fluid flow.

As an exemplary E12 product may be mentioned a filter medium comprising a pre-filter substrate and a fine-filter substrate. The pre-filter substrate is manufactured in accordance with the variation of the above discussed seventh preferred embodiment of the present invention by using a three-layer headbox provided with two different furnishes such that the surface layers are of similar furnish and the center layer of the different furnish. The pre-filter substrate comprises 33 wt-% PET-fibers having a diameter of 6 micrometer, 10 wt-% PET-fibers having a diameter of 10 micrometer, 13 wt-% micro-glass fibers having an average diameter between 0.1 and 0.6 micrometer, 5 wt-% micro-glass fibers having an average diameter between 0.1 and 1.0 micrometer, 34 wt-% bi-component fibers having an average diameter between 8 and 25 micrometer, and 5 wt-% binder or meltable fibers. The pre-filter substrate has an MD-tensile strength of the order of 600-700 N/m, the CD-tensile strength of the order of 400-500 N/m, and the mean flow pore size varying between 8 and 10 micrometer.

The fine filter substrate comprises 28 wt-% PET-fibers having an average diameter between 10 and 15 micrometers, 56 wt-% micro-glass fibers having an average diameter between 0.1 and 1.0 micrometer, 9 wt-% micro-glass fibers having an average diameter between 1 and 3 micrometer, and 7 wt-% binder or meltable fibers. The fine-filter substrate has the MD-tensile strength of the order of 1800-1900 N/m, the CD-tensile strength of the order of 800-900 N/m, the Mullen burst strength (both wet and dry) within 50-100 kPa, and the mean flow pore size varying between 5 and 6 micrometer.

The MD-tensile strength for the laminated E12 product is of the order of 2000-2100 N/m, the CD-tensile strength of the order of 900-1000 N/m, the Mullen burst strength (both wet and dry) within 200-400 kPa, and the mean flow pore size between 3 and 4 micrometer.

Example 3—H13 Filter Medium

The filter medium in accordance with a fifteenth preferred embodiment of the present invention is designed to fulfil the requirements set by BS EN 1822 for an H13 filter medium, i.e. the DEHS efficiency is at least 99.95%. The H13 filter medium of the present invention has a total basis weight of 50 to 200 g/m$^2$, preferably from 80 to 150 g/m$^2$, more preferably 100-130 g/m$^2$. The H13 filter medium of the present invention contains a pre-filter substrate with a basis weight of 20 g/m$^2$-80 g/m$^2$, preferably 30 g/m$^2$-70 g/m$^2$, more preferably 35-50 g/m$^2$, corresponding to the pre-filter substrate discussed already above, and a fine-filter substrate having a basis weight of 30 g/m$^2$-100 g/m$^2$, preferably from 50-90 g/m$^2$, more preferably about 60 g/m$^2$.

The fine-filter substrate is formed of synthetic fibers like for instance PET, PP, PBT, PA, acrylic, lyocell, rayon, aramid, nylon, polyolefin, polyester, or viscose fibers; micro-glass fibers, and a second binder. The second binder comprises at least one of bicomponent fibers, multicomponent fibers, fully meltable fibers and binder resins. The binder resins comprise at least one of acrylic resins, alkyd resins, butadiene resins, epoxy resins, melamine formaldehyde resins, melamine resins, methacrylic resins, phenolic resins, polyamide resins, polyaromatic resins, polyester resins, polyethylene vinyl acetate copolymer resins, polyurea resins, polyurethane resins, polyvinyl acetate resins, polyvinyl acetyl resins, polyvinyl alcohol resins, polyvinylchloride (PVC) resins, resorcinol resins, styrene resins, urea phenol resins, urea formaldehyde resins, vinyl acetate resins and vinyl chloride resins or any combination thereof. The fine-filter substrate contains 10-80 wt-%, preferably from 50 to 80 wt-%, more preferably about 60-70 wt-% micro-glass fibers; 20-60 wt-%, preferably 15-40 wt-%, more preferably about 20-35 wt-% synthetic fibers and 2-15 wt-%, preferably about 3-10 wt-% second binder (including powder, granule or liquid binders). As to the second binder it should be understood that also bi- or multicomponent fibers may be used. However, in such a case the amount of both the synthetic fibers and the binder should be reduced. For example by replacing one half of the synthetic fibers with bi- or multicomponent fibers also the amount of the binder could be about halved. The micro-glass fibers have an average diameter of 0.01 to 5 micrometer, a majority, i.e. more than 60% of the fibers having an average diameter between 0.1 to 2 micrometers. However, as the micro-glass fibers are commercially available in various grades (0.4, 0.6, 0.8 etc. or 0.1-0.6 micrometers, 0.1-0.8 micrometers, 0.1-1 micrometers, 0.5-5 micrometers, etc., referring to the average diameter of the fibers in the grade) the micro-glass used in the furnish may be of only one grade or of a mixture of at least two grades.

In accordance with a preferred variation of the fifteenth embodiment of the present invention, micro-glass from at least two different grade, or diameter ranges, is used, i.e. about 3-10 wt-% of the micro-glass originating from a grade having an average diameter of 1 to 3 micrometers, and the rest (97-90 wt-%) originating from a grade having an average diameter of 0.1 to 1.0 micrometer. Preferably, the synthetic fibers are PET-fibers having an average diameter of 10-15 micrometers.

The web for the fine-filter substrate may be produced with any known papermaking-type machines such as commercially available fourdrinier, wire cylinder, Stevens former, rotoformer, inver former, venti former, and inclined delta former. After the fibrous web for the fine-filter substrate is dried to an appropriate dryness second binder, unless added to the furnish for making the fine-filter substrate, is applied on the web by spraying, gravure coating, impregnation, scattering etc. whereafter the web is heated to bind the various fibers to one another.

Finally, the fine-filter substrate may be provided, if desired, with means for making it repellent against water, humidity, hydro carbons and/or alcohols. Such chemical means may be formed of or comprise silicones or fluorochemicals. The chemicals may be arranged on one or more of the fibers forming the fine-filter substrate before the forming of the furnish, or the furnish may be provided with respective liquid chemicals, or the web may be provided with the chemicals by means of, for instance, impregnation or coating.

For producing the H13 filter medium the two substrates, i.e. the pre-filter substrate and the fine-filter substrate are laminated to one another by means of applying, for instance by gravure coating, curtain coating or spraying 3-10 g/m$^2$, preferably about 5 g/m$^2$, appropriate third binder, i.e. a hot melt binder or adhesive, like for instance ethylene-vinyl acetate (EVA) copolymers, polyolefins (PO), atactic polypropylene (PP or APP), polybutene-1, oxidized polyethylene, polyamides and polyesters, styrene block copolymers (SBC), preferably a polyurethane hot melt glue on one of the substrates, and thereafter combining the substrates to form the pulse-cleanable filter medium. Another way to laminate the two substrates together is to heat at least one of the substrates to make the thermoplastic already therein tacky, and thereafter to combine the substrates to form the pulse-cleanable filter medium. The thermoplastic here refers to either meltable or bi- or multicomponent fibers.

In accordance with another variation of the fifteenth preferred embodiment of the present invention the wire-sides of the substrates, i.e. the sides of the webs located against the wire during the manufacturing of the substrate, are positioned against one another in the final H13 filter medium. In accordance with yet another variation of the fifteenth preferred embodiment of the present invention the wire-side of one substrate is positioned against the side away from the wire of the other substrate in the final H13 filter medium. In accordance with a further variation of the fifteenth preferred embodiment of the present invention the wire-sides of the webs are positioned as the outer faces of the filter medium, i.e. the sides facing away from the wire in their manufacturing stage are being positioned against one another in the final H13 filter medium. When using the filter medium, it may be used as the wire side positioned as the dirty side, i.e. against the dirty fluid flow to the filter medium or the wire side as the clean side, i.e. facing away from the dirty fluid flow.

As an exemplary H13 product may be mentioned a filter medium comprising a pre-filter substrate and a fine-filter substrate. The pre-filter substrate is manufactured in accordance with the variation of the above discussed seventh preferred embodiment of the present invention by using a three-layer headbox provided with two different furnishes such that the surface layers are of similar furnish and the center layer of the different furnish. The pre-filter substrate comprises 33 wt-% PET-fibers having a diameter of 6 micrometer, 10 wt-% PET-fibers having a diameter of 10 micrometer, 13 wt-% micro-glass fibers having an average diameter between 0.1 and 0.6 micrometer, 5 wt-% micro-glass fibers having an average diameter between 0.1 and 1.0 micrometer, 34 wt-% bi-component fibers having an average diameter between 8 and 25 micrometer, and 5 wt-% binder or meltable fibers. The pre-filter substrate has the MD-tensile strength of the order of 600-700 N/m, the CD-tensile strength of the order of 400-500 N/m, and the mean flow pore size varying between 8 and 10 micrometer.

The fine filter substrate comprises 28 wt-% PET-fibers having an average diameter between 10 and 15 micrometers, 62 wt-% micro-glass fibers having an average diameter between 0.1 and 1.0 micrometer, 3 wt-% micro-glass fibers having an average diameter between 1 and 3 micrometer, and 7 wt-% binder or meltable fibers. The fine-filter substrate has the MD-tensile strength of the order of 1800-1900 N/m, the CD-tensile strength of the order of 800-900 N/m, the Mullen burst strength (both wet and dry) within 50-100 kPa, and a mean flow pore size varying between 4 and 5 micrometer.

The MD-tensile strength for the laminated H13 product is of the order of 2000-2100 N/m, the CD-tensile strength of the order of 900-1000 N/m, the Mullen burst strength (both wet and dry) within 200-400 kPa, and the mean flow pore size between 2.5 and 3.5 micrometer.

Example 4—H14 Filter Medium

The filter medium in accordance with a sixteenth preferred embodiment of the present invention is designed to fulfil the requirements set by BS EN 1822 for an H14 filter medium, i.e. the DENS efficiency is at least 99.995%. The H14 filter medium of the present invention has a total basis weight of 50 to 200 g/m$^2$, preferably from 80 to 150 g/m$^2$, more preferably 100-130 g/m$^2$. The H14 filter medium of the present invention contains a pre-filter substrate with a basis weight of 20 g/m$^2$-80 g/m$^2$, preferably 30 g/m$^2$-70 g/m$^2$, more preferably 35-50 g/m$^2$, corresponding to the pre-filter substrate already above, and a fine-filter substrate having a basis weight of 30 g/m$^2$-180 g/m$^2$, preferably from 50-120 g/m$^2$, more preferably 60-90 g/m$^2$.

The fine-filter substrate is formed of synthetic fibers like for instance PET, PP, PBT, PA, acrylic, lyocell, rayon, aramid, nylon, polyolefin, polyester, or viscose fibers; micro-glass fibers, and a binder, i.e. at least one of, for instance, acrylic resins, alkyd resins, butadiene resins, epoxy resins, melamine formaldehyde resins, melamine resins, methacrylic resins, phenolic resins, polyamide resins, polyaromatic resins, polyester resins, polyethylene vinyl acetate copolymer resins, polyurea resins, polyurethane resins, polyvinyl acetate resins, polyvinyl acetyl resins, polyvinyl alcohol resins, polyvinylchloride (PVC) resins, resorcinol resins, styrene resins, urea phenol resins, urea formaldehyde resins, vinyl acetate resins and vinyl chloride resins or any combination thereof. The fine-filter substrate contains 10-80 wt-%, preferably from 50 to 80 wt-%, preferably about 60-70 wt-% micro-glass fibers, 20-60 wt-%, preferably 15-40 wt-%, more preferably about 20-35 wt-% synthetic fibers and 2-15 wt-%, preferably about 3-10 wt-% second binder (including powder, granule or liquid binders). As to the second binder it should be understood that also bi- or multicomponent fibers may be used. However, in such a case the amount of both the synthetic fibers and the binder should be reduced. For example by replacing one half of the synthetic fibers with bi- or multicomponent fibers also the amount of the binder could be about halved. The micro-glass fibers have an average diameter of 0.01 to 5 micrometer, a majority, i.e. more than 60% of the fibers having an average diameter between 0.1 to 2 micrometers. However, as the micro-glass fibers are commercially available in various grades (0.4, 0.6, 0.8 etc. or 0.1-0.6 micrometers, 0.1-0.8 micrometers, 0.11 micrometers, 0.5-5 micrometers, etc., referring to the average diameter of the fibers in the grade) the micro-glass used in the furnish may be of only one grade or of a mixture of at least two grades.

In accordance with a preferred variation of the sixteenth embodiment of the present invention, micro-glass from at least two different sources, or diameter ranges, is used, i.e. about 25-40 wt-% of the micro-glass originating from a source having an average diameter of 0.1 to 0.8 micrometers, and the rest (75-60 wt-%) originating from a source having an average diameter of 0.1 to 1.0 micrometer. Preferably, the synthetic fibers are PET-fibers having an average diameter of 10 to 15 micrometers.

The web for the fine-filter substrate may be produced with any known papermaking-type machines such as commercially available fourdrinier, wire cylinder, Stevens former, rotoformer, inver former, venti former, and inclined delta former. After the fibrous web for the fine-filter substrate is dried to an appropriate dryness second binder is, unless added to the furnish for making the fine-filter substrate, applied on the web by spraying, gravure coating, impregnation, scattering etc. whereafter the web is heated to bind the various fibers to one another.

Finally, the fine-filter substrate may be provided, if desired, with means for making it repellent against water, humidity, hydro carbons and/or alcohols. Such chemical means may be formed of or comprise silicones or fluorochemicals. The chemicals may be arranged on one or more of the fibers forming the fine-filter substrate before the forming of the furnish, or the furnish may be provided with respective liquid chemicals, or the web may be provided with the chemicals by means of, for instance, impregnation or coating.

For producing the H14 filter medium the two substrates, i.e. the pre-filter substrate and the fine-filter substrate are laminated to one another by means of applying, for instance by gravure coating, curtain coating or spraying 3-10 g/m$^2$, preferably about 5 g/m$^2$, appropriate third binder, i.e. a hot melt binder or adhesive, like for instance ethylene-vinyl acetate (EVA) copolymers, polyolefins (PO), atactic polypropylene (PP or APP), polybutene-1, oxidized polyethylene, polyamides and polyesters, styrene block copolymers (SBC), preferably a polyurethane hot melt glue on one of the substrates, and thereafter combining the substrates to form the pulse-cleanable filter medium.

In accordance with a another variation of the sixteenth preferred embodiment of the present invention the wire-sides of the webs, i.e. the sides of the webs located against the wire during the manufacturing of the webs, are positioned against one another in the final H14 filter medium. In accordance with yet another variation of the sixteenth preferred embodiment of the present invention the wire-side of one web is positioned against the side away from the wire of the other web in the final H14 filter medium. In accordance with a further variation of the sixteenth preferred embodiment of the present invention the wire-sides of the webs are positioned as the outer faces of the filter medium, i.e. the sides facing away from the wire in their manufacturing stage are being positioned against one another in the final H14 filter medium. When using the filter medium, it may be used as the wire side positioned as the dirty side, i.e. against the dirty fluid flow to the filter medium or the wire side as the clean side, i.e. facing away from the dirty fluid flow. As an exemplary H14 product may be mentioned a filter medium comprising a pre-filter substrate and a fine-filter substrate. The pre-filter substrate is manufactured in accordance with the variation of the above discussed seventh preferred embodiment of the present invention by using a three-layer headbox provided with two different furnishes such that the surface layers are of similar furnish and the center layer of the different furnish. The pre-filter substrate comprises 33 wt-% PET-fibers having a diameter of 6 micrometers, 10 wt-% PET-fibers having a diameter of 10 micrometers, 13 wt-% micro-glass fibers having an average diameter between 0.1 and 0.6 micrometers, 5 wt-% micro-glass fibers having an average diameter between 0.1 and 1.0 micrometers, 34 wt-% bicomponent fibers having an average diameter between 8 and 25 micrometers, and 5 wt-% binder or meltable fibers. The pre-filter substrate has the MD-tensile strength of the order of 600-700 N/m, the CD-tensile strength of the order of 400-500 N/m, and the mean flow pore size varying between 8 and 10 micrometers.

The fine-filter substrate comprises 28 wt-% PET-fibers having an average diameter between 10 and 15 micrometers, 23 wt-% micro-glass fibers having an average diameter between 0.1 and 0.8 micrometer, 42 wt-% micro-glass fibers having an average diameter between 0.1 and 1.0 micrometer, and 7 wt-% binder or meltable fibers. The fine-filter substrate has the MD-tensile strength of the order of 1800-1900 N/m, the CD-tensile strength of the order of 800-900 N/m, the Mullen burst strength (both wet and dry) within 50-100 kPa, and the mean flow pore size varying between 3 and 4 micrometers.

The laminated H14 product has the MD-tensile strength of the order of 2000-2100 N/m, the CD-tensile strength of the order of 900-1000 N/m, the Mullen burst strength (both wet and dry) within 200-400 kPa, and the mean flow pore size between 1.5 and 2.5 micrometers.

Example 5

The filter medium in accordance with a seventeenth preferred embodiment of the present invention has a total basis weight of 80 to 140 g/m$^2$, preferably from 100 to 130 g/m$^2$, more preferably about 110-120 g/m$^2$. The filter medium of the present invention contains a pre-filter substrate with a basis weight of 30 g/m$^2$-60 g/m$^2$, preferably 35 g/m$^2$-50 g/m$^2$, more preferably 40-50 g/m$^2$, corresponding to those discussed already above under heading ‘Pre-filter substrate’, and a fine-filter substrate having a basis weight of 30 g/m$^2$-100 g/m$^2$, preferably from 50-90 g/m$^2$, more preferably about 60-70 g/m$^2$.

Unlike the earlier discussed embodiments the fine-filter substrate is applied directly on the pre-filter substrate, i.e. without manufacturing a web of its own as the fine-filter substrate. Thus, after the pre-filter substrate is prepared, on one surface thereof, i.e. either the wire-side surface thereof or the opposite surface, is applied, for instance by gravure coating, curtain coating or spraying, 3-10 g/m$^2$, preferably about 5 g/m$^2$, appropriate third binder, like for instance ethylene-vinyl acetate (EVA) copolymers, polyolefins (PO), atactic polypropylene (PP or APP), polybutene-1, oxidized polyethylene, polyamides and polyesters, styrene block copolymers (SBC), preferably a polyurethane hot melt glue on the pre-filter substrates, and thereafter the fine-filter material, i.e. at least 50-100 wt-% of the fine-filter substrate material, preferably 70-100 wt-%, more preferably 85-100 wt % micro-glass is applied on the binder layer. Together with micro-glass 0-50 wt-%, preferably 0-10 wt-%, more preferably 2-6 wt-% additional second binder may be applied. After a desired amount of fine-filter material is applied on the pre-filter substrate the two substrates are combined to form the pulse-cleanable filter medium.

As to making the fine-filter substrate repellent against water, humidity, hydro carbons and/or alcohols by means of, for instance, silicones or fluorochemicals the fibers forming the fine-filter substrate may be treated with the chemicals before the forming of the fiber mix for the fine-filter substrate, or the fiber mix may be provided with respective liquid chemicals, or the entire pack of the two substrates may be provided with the chemicals by means of, for instance, impregnation or coating.

The filter medium of the present invention may be used in engine or hydraulic oil filters, in intake air filters for gas turbines or internal combustion engines and in HVAC- or APC-filters, just to name a few options without any intention of limiting the use of the invention to the listed applications. Filtration systems in which the filtration medium as described herein may be employed are well known in the art. For example, the filter medium can be pleated to form a filter element which may be removable or disposable, i.e. in the filtration system, the filter element may be regularly changed when necessary. In all such filters the filter medium is placed in either pleated, corrugated, cylindrical or planar configuration and in cartridge, panel or bag form in a casing arranged on the flow path of the fluid to be filtered. In a preferred embodiment, the filter medium of the present invention is used in a way such that the fluid to be filtered exits the filter medium at the side of the medium upon which the fine filter substrate is allocated.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The detailed features mentioned in connection with any embodiment above may be used in connection with another embodiment whenever such combination is technically feasible.

What is claimed is:

1. A filter medium for filtering a fluid comprising, a prefilter substrate comprising a fibrous nonwoven web having at least a first layer, a second layer, and a third layer; wherein the first layer, the second layer, and the third layer are entangled to one another;

the second layer is located between the first layer and the third layer;

the first layer and the third layer each independently comprise at least a first binder and first synthetic fibers; and the second layer comprises the first binder, micro-glass fibers, and second synthetic fibers; and a fine-filter substrate comprises a second binder and at least one of third synthetic fibers and first inorganic fibers; and wherein the prefilter substrate is laminated by means of a hot melt binder or an adhesive to the fine-filter substrate to form a laminated filter medium, a first mean flow pore size of the fine-filter substrate ranges from 3 to 10 micrometers, and second mean flow pore size of the laminated filter medium ranges from 1.5 to 6 micrometers.

2. The filter medium of claim 1, wherein the first binder in the first, second, and third layer independently comprises at least one of multicomponent fibers, fully meltable fibers, and first binder resin.

3. The filter medium of claim 1, wherein at least one of the first layer, the second layer, and the third layer further comprises second inorganic fibers.

4. The filter medium of claim 1, wherein the first layer and the third layer each independently comprise between 5 and 30 wt. % first synthetic fibers and no more than 10 wt. % first binder with all components of the first layer totaling 100 wt. % of the first layer, and all components of the third layer totaling 100 wt. % of the third layer.

5. The filter medium of claim 1, wherein the second layer comprises between 15 and 25 wt. % second synthetic fibers, between 10 and 30 wt. % micro-glass fibers, and no more than 10 wt. % first binder with all components of the second layer totaling 100 wt. % of the second layer.

6. The filter medium of claim 1, wherein the fine-filter substrate comprises between 20 and 60 wt. % third synthetic fibers, between 10 and 80 wt. % first inorganic fibers, and between 2 and 15 wt. % second binder with all components of the fine-filter substrate totaling 100 wt. % of the fine-filter substrate.

7. The filter medium of claim 1, wherein the fine-filter substate comprises chop-strand glass fibers having an average diameter of between 1 and 30 micrometers.

8. The filter medium of claim 1, wherein the third synthetic fibers comprise at least one of PET, PP, PBT, PA, lyocell, rayon, aramid, nylon, polyolefin, polyester, viscose, and acrylic fibers, and the third synthetic fibers have an average diameter between 0.1 and 100 micrometers.

9. The filter medium of claim 1, wherein the first inorganic fibers have an average diameter between 0.01 and 5 micrometers.

10. The filter medium of claim 1, wherein the prefilter substrate and the fine-filter substrate are bonded together by a third binder selected from the group consisting of ethylene-vinyl acetate (EVA) copolymers, polyolefins (PO), atactic polypropylene (PP or APP), polybutene-1, oxidized polyethylene, polyamides and polyesters, styrene block copolymers (SBC), polyurethane hot melt glue, and combinations thereof.

11. The filter medium of claim 1, having a Mullen burst strength (both wet and dry) of between 200 and 400 kPa.

12. The filter medium of claim 2, wherein the multicomponent fibers comprising at least one of PET/co-PET, PET/co-PE, PET/co-PP, and PET/co-PA fibers, the multicomponent fibers having a finess of 1 to 15 den.

13. The filter medium of claim 2, wherein the second binder comprises a second binder resin, and the first binder resin and the second binder resin are selected from the group consisting of acrylic resins, alkyd resins, butadiene resins, epoxy resins, melamine formaldehyde resins, melamine resins, methacrylic resins, phenolic resins, polyamide resins, polyaromatic resins, polyester resins, polyethylene vinyl acetate copolymer resins, polyurea resins, polyurethane resins, polyvinyl acetate resins, polyvinyl acetyl resins, polyvinyl alcohol resins, polyvinylchloride (PVC) resins, resorcinol resins, styrene resins, urea phenol resins, urea formaldehyde resins, vinyl acetate resins, vinyl chloride resins, and combinations thereof.

14. The filter medium of claim 2, wherein the fully meltable fibers are selected from the group consisting of PE (polyethylene) fibers, PP fibers, polyvinyl chloride (PVC) fibers, polyvinyl alcohol (PVA) fibers, and combinations thereof.

15. A filter comprising a casing and at least one filter cartridge, filter panel, or filter bag arranged therein; and the at least one filter cartridge, filter panel, or filter bag comprises the filter medium recited in claim 1.

16. A filter for filtering engine or hydraulic oils comprising the filter medium in accordance with claim 1 wherein the filter medium is used in pleated, corrugated, cylindrical, or planar configuration.

17. The filter medium of claim 3, wherein at least one of:

the first synthetic fibers and the second synthetic fibers compared to the third synthetic fibers, or the first inorganic fibers compared to the second inorganic fibers are from at least two different diameter grades.

* * * * *